United States Patent [19]

Wincent

[11] 4,135,592
[45] Jan. 23, 1979

[54] FOUR-WHEEL-DRIVE ARTICULATED FRAME STEERING VEHICLE

[75] Inventor: Alf G. R. Wincent, Burtrask, Sweden

[73] Assignee: Trelleborgs Gummifabriks Aktiebolag, Trelleborg, Sweden

[21] Appl. No.: 806,872

[22] Filed: Jun. 15, 1977

[30] Foreign Application Priority Data

Jun. 18, 1976 [SE] Sweden .................................. 7606987

[51] Int. Cl.² ........................ B62D 51/04; B60K 41/00
[52] U.S. Cl. .................................... 180/19 H; 180/51; 180/77 H; 180/77 HT; 180/134; 74/471 R
[58] Field of Search ................. 180/19 S, 19 H, 19 R, 180/51, 52, 77 H, 77 HT, 44 F, 134, 136, 137; 74/471 R, 471 XY

[56] References Cited

U.S. PATENT DOCUMENTS

| | | | |
|---|---|---|---|
| 2,957,534 | 10/1960 | Burdett | 180/19 H |
| 3,117,649 | 1/1964 | Parton | 180/77 H |
| 3,275,093 | 9/1966 | Pawl | 74/471 R X |
| 3,444,945 | 5/1969 | Coordes | 180/19 H |
| 3,768,328 | 10/1973 | Campbell | 74/471 R X |
| 3,814,531 | 6/1974 | Carnahan | 180/136 X |

Primary Examiner—John P. Silverstrim
Attorney, Agent, or Firm—Beveridge, DeGrandi, Kline & Lunsford

[57] ABSTRACT

The disclosure relates to a four-wheel drive articulated frame steering vehicle for material handling in difficult terrain, the vehicle having a control bar assembly which projects ahead of the vehicle and is connected to a valve system for forward and reverse movement and to a valve system for turning to the left and right.

8 Claims, 4 Drawing Figures

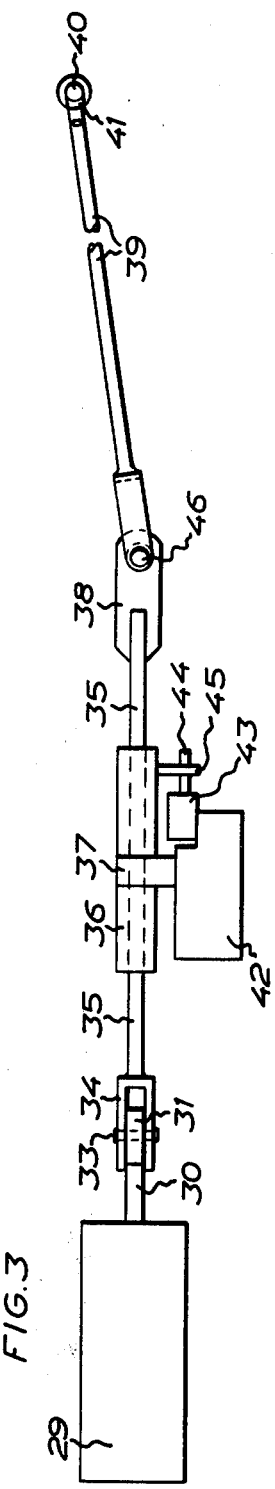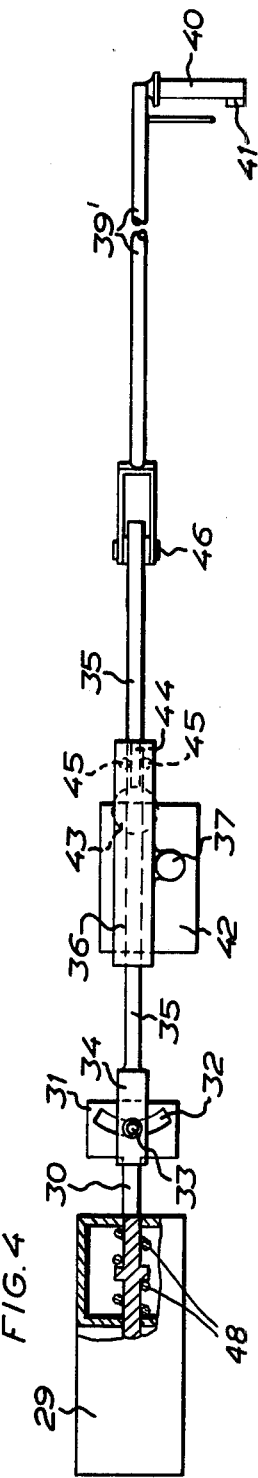

FOUR-WHEEL-DRIVE ARTICULATED FRAME STEERING VEHICLE

The present invention relates to a land vehicle for use in forestry, more precisely a so-called forwarder. In conventional forestry machines of this type, the operator is carried on the vehicle, whereas the operator of the vehicle according to the present invention walks ahead of the vehicle.

Conventional forestry vehicles are controlled by a driver placed on the vehicle, for which reason certain requirements as regards safety and comfort must be satisfied. Thus, a ventilated and heated, fully enclosed cab with a roll bar is necessary, and moreover, the vehicle must not be too narrow in view of the risk for tipping and careening. Consequently, conventional forwarders are relatively large and are used for forwarding timber from the cutting site to a public transport highway. Such conventional forwarders are suitable in clear-felling and extensive thinning but are, for several reasons, ill-suited for so-called smallwood thinning, primary thinning or any other occasion when the vehicle must not damage the surrounding vegetation. Smallwood thinning and primary thinning are carried out in young forest where the gap between the trees is small and passability often restricted.

Consequently, an object of the present invention is to realize a mechanical aid which may be used in material handling in difficult terrain, in particular in forestry work, the mechanical aid being designed as a self-propelled vehicle which is to follow an operator walking ahead of the vehicle.

Another object of the present invention is to realize a self-propelled vehicle of such a type as will, because of steering and control equipment associated with the vehicle, follow substantially in the footsteps of the operator.

A further object of the present invention is to realize a self-propelled vehicle which is highly manoeuvrable and is of small dimensions.

According to the present invention, the self-propelled vehicle is designed as an articulated frame steering hydraulicmechanically driven vehicle, whose manoeuvring under operation is controlled by means of a steering rod projecting ahead of the vehicle, the movements of the steering rod acting upon steer, drive and brake devices in the vehicle.

More precisely, the vehicle is provided with hydraulic power transmission means between, on the one hand, a vehicle motor, and, on the other hand, the four driven wheels, and a hydraulic, articulated frame steering motor. Moreover, the vehicle is provided with a steering and control apparatus in the form of a control bar assembly which projects forwardly of the vehicle and is connected to a valve means included in the hydraulic power transmission means for forward and reverse movement, and a valve means, similarly included in the power transmission means for turning to the left and right.

It is known from, for example, Swedish Patent Specification No. 336,049, to manoeuver industrial trucks with the help of a steering rod projecting from the truck. However, this prior-art truck is of a completely different construction from the self-propelled vehicle according to the present invention. Primarily, the projecting rod serves to actuate directly the front wheels of the truck for mechanically turning them when the truck is to change direction. Such a prior-art truck could not be used in difficult terrain and cannot, therefore, be compared with the vehicle according to the present invention.

The present invention and its aspects will be more readily understood from the following description of the accompanying drawings, and discussion relating thereto.

In the accompanying drawings:-

FIG. 3 is a schematic side elevation of the steering and control equipment included in the vehicle; and FIG. 4 is a schematic plan view of the same equipment modified to include an elastically resilient steering rod, and broken away to show a neutral-biasing spring associated with the control valve.

Figure 1:
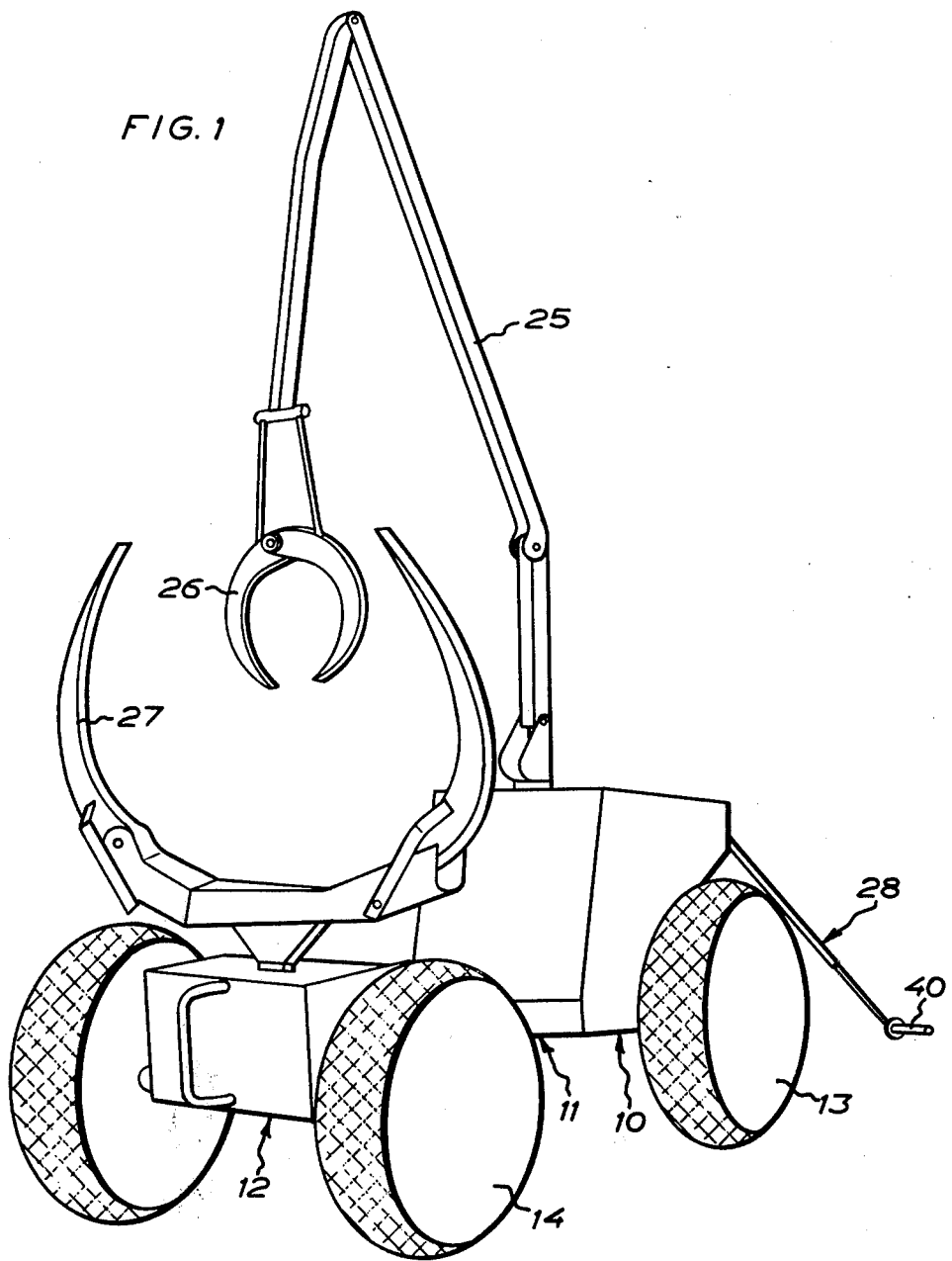
FIG. 1 is a schematic perspective view of a self-propelled vehicle, a mini-forwarder, according to the present invention.
Figure 2:
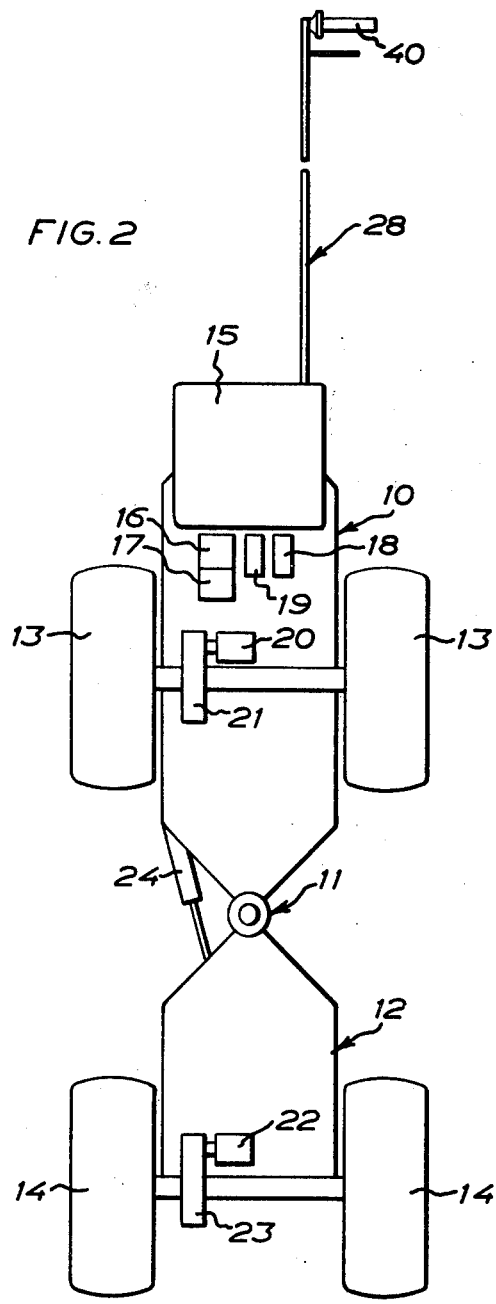
FIG. 2 is a schematic top plan view of the same vehicle.

As is apparent from FIGS. 1 and 2, the vehicle according to the present invention has been designed, in a per se known manner, as an articulated frame steering, self-propelled vehicle. The leading portion 10 of the vehicle is, thus, connected, by means of a joint 11 permitting considerable relative angular movement in any plane, for example, a ball and socket joint, to the trailing portion 12 of the vehicle. The vehicle has front and rear wheels 13, 14 respectively. An internal combustion engine 15 is mounted on the leading portion of the vehicle, this combustion engine driving a number of hydraulic fluid pumps. Thus, there are provided, on the leading portion of the vehicle, drive pumps 16, 17, a control pump 18 and a pump 19 for the loading devices of the vehicle. The wheel pair 13 on the leading portion of the vehicle is driven by means of a hydraulic motor 20 which, by means of a driving connection 21, is connected to the axles of the wheels. The wheel pair 14 on the trailing portion of the vehicle is driven, in a similar manner, by means of a hydraulic motor 22 and a driving connection 23, respectively. A hydraulic cylinder 24 serves to steer the frame steering vehicle and is, therefore, connected to the leading and trailing vehicle portions at a distance from the joint 11. This hydraulic cylinder receives its hydraulic fluid from the control pump 18.

On the vehicle there are also provided loading devices comprising a crane arm 25 with gripping jaws 26 and a cradle 27 in which one end of the intended load, in the form of timber logs, is placed and fixedly retained. These apparatuses are known and will not, therefore, be described in detail The loading devices are set in operation only when the vehicle is stationary and the hydraulic fluid flow necessary for the operation of the loading devices is obtained from the pump 19 via connection hoses (not shown).

The frame steering vehicle has a forwardly projecting control bar assembly 28 whose construction and function will now be described in greater detail with reference to FIG. 3 and 4. In the illustrated embodiment, a three-way forward-reverse valve 29 is mounted on the leading portion of the vehicle. This three-way valve has a valve shaft 30 which, at its outer end, has a disc 31 with a slot 32. A pin 33 projects into this slot, the pin being fixedly retained in a fork 34 on a control bar 35. This bar extends through a tube 36 which is fixedly retained on a rotary shaft 37 and through which the bar 35 is shiftable. At its other end, the bar 35 is connected to a leaf spring 38 which, in turn, is connected to a steering rod 39 with a hand throttle 40 and a dead-man's handle 41. A control valve 42 is mounted below the tube 36. The valve 42 has a valve control head 43 whose arm is surrounded by two pins 45 projecting downwardly from the underside of the tube 36. When the bar 35 is pivoted about the shaft 37, the pin 45 will swing the arm 44 of the control head in one direction or the other. The pivoting of the bar is permitted in that the pin 33 can move in the arcuate slot 32. Any excessively powerful swinging of the steering rod 39 in a lateral direction will be absorbed by the leaf spring 38 so that the valves are not damaged. However, instead of providing a leaf spring, it is possible to provide an elastically resilient steering rod 39 as shown in FIG. 4. With this structure the steering rod itself yields and thereby prevents damage to the valves. In order to allow for a swinging of the rod 39 in the vertical direction, the rod is connected to the leaf spring by means of a swivel 46.

The control bar assembly 28 functions as follows. If the steering rod 39 is pulled forwardly, it will put out the valve shaft 30 so that the valve 29 allows hydraulic fluid to pass from the pumps 16, 17 to the hydraulic motors 20, 22 for forward movement. If the operator walking ahead of the vehicle stops, or if the vehicle shows a tendency to move faster than the operator, the rod 39 will instead be moved backwardly with respect to the vehicle so that the valve shaft 30 is forced in, the valve 29 constricting somewhat the passage of the hydraulic fluid to the hydraulic motors 20, 22 so that the forward movement of the vehicle will be slower or entirely arrested, If the rod 39 is moved even further back, the vehicle may be caused to reverse.

If the operator swings the steering rod 39 in one direction or the other, the tube 36 will pivot on its shaft 37, the pins 45 mounted on the underside of the tube 36 swinging the arm 44 of the valve control head in one direction or the other. The valve 42 is constructed such that it feeds the hydraulic fluid to the vehicle-turning cylinder assembly 24 and extends or shortens this assembly dependent upon whether a swinging movement to the right or to the left is desired, the leading portion of the vehicle pivoting in relation to the trailing portion of the vehicle. Because of this construction, the vehicle will follow the path of the operator and will, moreover, regulate its own speed in dependence upon the walking speed of the operator.

In order to avoid the risk that the vehicle, in certain situations, drive over the operator, the vehicle is provided with preferably two mutually independent safety functions. As shown in FIG. 4, the valve 29 is constructed such that it has a spring-biased neutral function. As shown in the diagrammatic sectional view of FIG. 4, the valve shaft 30 is shiftable by control bar 35 against the action of a spring 48 from the illustrated neutral position in which the vehicle is braked, in one direction for forward movement of the vehicle and in the other direction for reversing of the vehicle. When the steering rod 39 is released by the operator, the valve 29 will be set at a neutral position where fluid on the hydraulic motor side is blocked. This entails that the vehicle stops and brakes as soon as the driver ceases actuating the steering rod 39. The second safety device consists of the dead-man's handle 41 in the form of an electric switch which is placed at the handle 40 and cuts off the ignition current to the combustion engine 15 when the button is released.

The vehicle according to the invention can be designed with very small dimensions while retaining large load capacity. Thus, a practical embodiment of the vehicle has been designed 1.3 m wide and 3.2 m long, the loading capacity of the vehicle being 1 metric ton. In this embodiment, the steering rod 39 is 2.5 m long. Despite this weight and the dimensions of the vehicle, the vehicle will follow like a dog in its master's footsteps.

What I claim and desire to secure by Letters Patent is:

1. A four-wheel-drive articulated frame steering vehicle for material handling in difficult terrain, comprising a vehicle motor, four driven wheels, hydraulic power transmission means connecting said vehicle motor to the four driven wheels, a first valve means included in the hydraulic power transmission means for forward and reverse movement, a hydraulic, articulated frame-steering motor, a second valve means included in the power transmission means and connected to said frame-steering motor for turning the vehicle to the left and right, said vehicle being provided with a steering and control apparatus which includes a control bar assembly which is connected to both said valve means and projects forwardly of the vehicle, said control bar assembly having a control bar, a pivotally mounted tubular sleeve receiving said control bar for longitudinal shifting movement therein and pivotal movement therewith, means for actuating the second valve means in response to pivotal movement of said sleeve for turning to the left and right, said control bar being connected to the first valve means via a slot and pin connection for permitting swinging of the control bar.

2. The vehicle as recited in claim 1 wherein the first valve means for forward and reverse movement is movable by shifting of the control bar in the longitudinal direction from a neutral position in which said vehicle is braked in one direction for forward movement of the vehicle and in the other direction for reversing of the vehicle, and a spring biasing said first valve means to said neutral position.

3. The vehicle as recited in claim 2 wherein a steering rod is connected by a joint to the forwardly directed end of the control bar disposed on the vehicle, said steering rod being pivotal about the joint in a vertical plane.

4. The vehicle as recited in claim 3 having a leaf spring means connecting the control bar to the steering rod.

5. The vehicle as recited in claim 3 wherein the steering rod is elastically resilient.

6. The vehicle as recited in claim 1 wherein a steering rod is connected by a joint to the forwardly directed end of the control bar disposed on the vehicle, said steering rod being pivotal about the joint in a vertical plane.

7. The vehicle as recited in claim 6 having a leaf spring means connecting the control bar to the steering rod.

8. The vehicle as recited in claim 6 wherein the steering rod is elastically resilient.

* * * * *